A. VAIL.
Whiffletree.
No. 91,500.
Patented June 15, 1869.
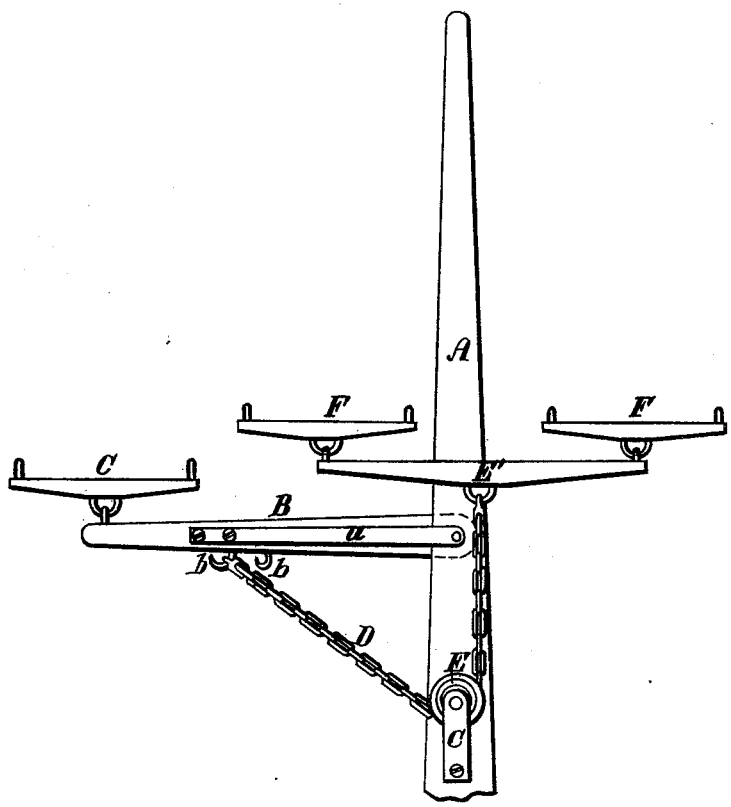
Witnesses:
Geo. W. Rothwell
Phil. F. Larner
Inventor:
Alex. Vail
by Niedersheim
Attys.

United States Patent Office.

ALEXANDER VAIL, OF HENRY, ILLINOIS.

*Letters Patent No. 91,500, dated June 15, 1869.*

IMPROVEMENT IN WHIFFLETREES.

The Schedule referred to in these Letters Patent and making part of the same.

*To all whom it may concern:*

Be it known that I, ALEXANDER VAIL, of Henry, in the county of Marshall, and State of Illinois, have invented a new and improved Draught-Equalizer; and I do hereby declare that the following is a full, clear, and exact description thereof, sufficient to enable others skilled in the art to which my invention appertains, to make and use the same, reference being had to the accompanying drawings, making a part of this specification, and in which my invention is represented by a top view.

In this invention, a lever, to the outer end of which a single-tree is hung, is pivoted at its opposite end to the pole. A chain, adjustably connected with this lever, passes around a pulley, mounted on top the pole, near its rear end, and is attached to the centre of a double-tree.

The invention consists in the construction, arrangement, and combination of parts, as hereinafter described.

The invention will be fully understood by reference to the accompanying drawings, considered in connection with the following detail description.

In the drawing—

A represents the pole, to the under side of which is pivoted a lever, B.

*a* is a strap, which may be used to strengthen the attachment of the lever to the pole.

C represents a single-tree, hung to the outer end of the lever B.

In the lever B are set several hooks, *b b*, with either of which one end of a chain, D, may be connected.

This chain passes around a roller, or pulley, E, mounted on top the pole A, in a strap, *c*.

To the other end of the chain, D, is attached a double-tree, E' F F.

It will be seen that the draught on the double-tree will be in a straight line with the tongue, and the horses harnessed to the double-tree thus work the same as if there were but two.

When the draught from the lever B comes on the pulley, the double-tree is drawn back, and when the horses connected with the double-tree draw more than two-thirds, the horse at the lever is drawn back.

By adjusting the attachment of the chain to the lever B, the horse connected with said lever can be made to exert such proportion of the entire draught of the team as is desired.

Thus the third horse, on account of the unequal leverage, is made to pull as much as the two on the tongue, or one, or two-thirds as much, or any other proportion, by adjusting the connection of the chain with the lever, as will be obvious.

By this invention, a very simple and durable self-acting device is produced, whereby the draught is equalized according to the strength of the several horses.

I am aware of the patent granted to J. B. Morrison, dated October 23, 1866, for a three-horse splinter-bar; and also of the patent to L. Mancy, 29th December, 1868, for whiffletree-attachment, but neither of these do I claim, as they form no part of my invention.

Having thus described my invention,

What I claim as new, and desire to secure by Letters Patent, is—

The double-tree E', single-trees F F, pulley E, and chain D, in combination, with the pivoted lever B, provided with adjustable hooks *b b*, and single-tree C, all constructed, arranged, and operated in the manner and for the purpose set forth.

To the above, I have signed my name, this 24th day of March, 1869.

ALEXANDER VAIL.

Witnesses:
PETER McMANUS,
JOHN P. BOISE.